Figure 1:
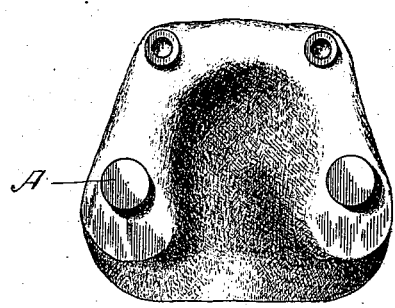

(No Model.)

C. C. CARROLL.
PROCESS OF MAKING DENTAL PLATES AND BRIDGES.

No. 380,021. Patented Mar. 27, 1888.

Witnesses:
T. R. Stuart.
L. Seward Bacon.

Inventor,
Craft C. Carroll,
By Emma Marble
Atty.

UNITED STATES PATENT OFFICE.

CRAFT C. CARROLL, OF MEADVILLE, PENNSYLVANIA.

PROCESS OF MAKING DENTAL PLATES AND BRIDGES.

SPECIFICATION forming part of Letters Patent No. 380,021, dated March 27, 1888.

Application filed February 4, 1887. Serial No. 226,504. (No model.)

*To all whom it may concern:*

Be it known that I, CRAFT C. CARROLL, a citizen of the United States, residing at Meadville, in the county of Crawford and State of Pennsylvania, have invented certain new and useful Improvements in the Process of Making Dental Plates and Bridges; and I do hereby declare the following to be a full, clear, and exact description of the invention, such as will enable others skilled in the art to which it appertains to make and use the same.

My invention relates to an improved process of making dental plates and bridges of aluminum or aluminum alloys, and of repairing and replacing one or more teeth which may be decayed, broken, or entirely lost from the upper or lower dental arch by casting. The process heretofore and still usually practiced in such restorations in prosthetic dentistry, where metallic appliances are employed, is to bend or swage a crown, bridge, or base-plate, as the case in hand to be repaired may require, and then complete the appliance by soldering with the use of the blow-pipe. In said process, if a crown is to be made, a metallic band or thimble is bent or swaged to fit around the decayed or broken tooth. A cap is then bent or swaged and soldered to cover this open thimble, so that when it is placed around or over the decayed or broken tooth or root and fastened in place, as is usual, with a plastic cement of oxyphosphate of zinc it will occlude or antagonize properly with the corresponding tooth in the opposite jaw or maxilla.

If what is known as a "bridge" in dentistry is to be made to supply the space of one or more broken or lost teeth, it is usual to make a metallic band or crown by bending or swaging and soldering, which will surround a tooth or root adjacent to and at either end of said space, and then solder to the said band or crown a strip of gold or platinum or other metal of such length that it will span or bridge said vacant space; then attach teeth by solder to the metallic bridge in such a manner that when completed and cemented in place it shall supply the lost teeth and serve the purpose of mastication. If the loss can be best repaired by the insertion of one or more teeth upon a metallic dental plate, then it is usual to swage or strike up between metallic dies of Babbitt or other suitable metal a base-plate of gold, silver, or platinum, representing a cast or counterpart of the part to be supplied, and then attach by solder one or more teeth properly occluded, as the case may require, to supply the deficiency and serve the purpose of mastication, which plate or denture, when finished, is held in place, if above, by atmospheric-pressure; if below, by specific gravity chiefly.

My improvement or invention consists in making and repairing each and all of these styles or forms of dental appliances, whether a crown, a bridge, or a partial or a complete metallic dental plate, by a single cast of aluminum or the alloys of aluminum.

The method or process I employ in making these cast dentures, and which I believe to be original with me, I will now fully describe and set forth.

Figure 2:
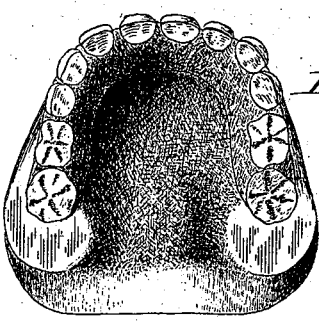
Figure 3:
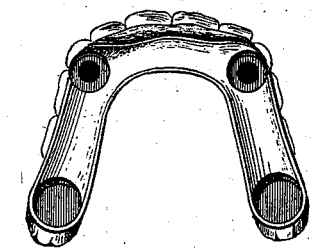

I first take an exact impression of the part to be supplied in plaster-of-paris, wax, or other suitable impression material. From this impression I produce a model of the arch that is to be supplied after the usual manner of obtaining such models. (See Figure 1.) Upon this model I mold or shape, in the case of a crown, the exact form in wax, paraffine, or other suitable material, the crown as it is intended to be worn to supply the loss occasioned by the decay or fracture of the tooth, as A, Fig. 1. In the case of a bridge I mount upon my model the tooth or teeth required to supply the deficiency, using wax, paraffine, or other suitable material, which I mold, shape, or carve, so as to cover neatly the alveolar border, together with such adjacent root or roots, with a crown; or if there be adjacent teeth, I surround them with a band or ferrule to which I desire to attach my bridge, making the crown and bridge or span one continuous piece, neatly carved with the tooth or teeth, as the case may be, mounted in position as desired to be worn. (See Figs. 1, 2, and 3.)

One of the great advantages of my cast metallic bridge-work over all other forms of bridge-work consists in its being a perfect counterpart of that portion of the alveolar border on which it is to rest, thus distributing equally the force in mastication over the entire surface covered, embracing both the capped roots or banded teeth and the soft parts alike, instead of requiring the capped roots or banded teeth alone to support the bridge. By my method a more perfect adaptation is secured, thus preventing food from getting between the soft parts and the denture; hence a more cleanly and healthy denture is secured.

Figure 4:
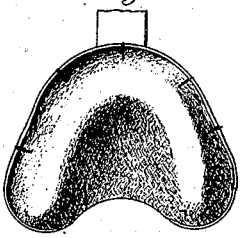
Figure 5:
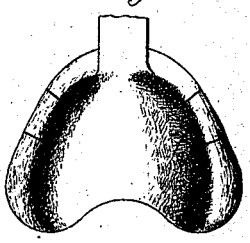

If it is desired to supply the space of one or more lost teeth by a partial or full dental plate for either arch, I take an impression in wax or modeling composition, or, preferably still, in plaster-of-paris, and in order that the expansion of the plaster in the act of what is called "setting" shall be uniform throughout the mass, and not constrained and distorted, as is usual when taken with plaster in the ordinary metallic impression cup or tray, I employ a cup or tray of my own devising, made out of soft or flexible rubber, shaped after the usual patterns, with the exception that the alveolar border or rim is cut into sections, (see Figs. 4 and 5,) in order to give the greater freedom to the molecules of plaster, so that they may arrange themselves according to their natural and true morphological law, thus giving me an accurate fac-simile of the arch slightly expanded or enlarged in all directions in the impression. I then varnish and oil the surface of the impression and pour with plaster, after the usual manner, which, when set and hard, makes a model of the arch slightly expanded or enlarged, which is very desirable in making a cast aluminum dental plate, or a plate of the alloys of aluminum, which have a tendency to contract in casting the aluminum to a considerable extent, and the alloys to a very slight extent, and hence to compress the porous plaster model on which it is cast, causing the plate, when cool and finished, to be too small to fit accurately the arch, were it not for the compensating expansion secured by the use of my flexible rubber impression cap or tray.

Having thus described my process of obtaining the desired model for this particular kind of dentures, I will now describe my method of casting, finishing, and mending such metallic cast dentures.

I make, first, a temporary base-plate, of paraffine, wax, or other suitable material, of the exact thickness that I desire my finished metallic plate to be, usually, if for the upper arch, about No. 22 standard gold-plate gage. On this base-plate I mount my teeth, using chiefly the ordinary porcelain teeth for rubber work, articulated after the usual manner, securing them in place by wax or other suitable material, which I carve or shape to the form or contour which I desire in order to completely restore not only the lost teeth, but the absorbed or wasted hard and soft parts of the alveolar border. I then invest this model with the temporary wax base-plate and teeth, mounted upon it, as described, in a two-part iron flask containing perforated backs for the escape of moisture in drying, as shown in the drawings, Figs. 6 and 7, using calcined plaster-of-paris, or, preferably, a composition of plaster, sand, or marble-dust, and soapstone, for my investing material; and in order to prevent the aluminum or its alloys from fracturing the artificial gums of my teeth by contraction I grind the joints with flat approximating faces, leaving a slight separation by the insertion of a thin piece of paper between the joints while mounting, and when done mounting I remove these pieces of paper and fill the interstices with plaster-of-paris or oxyphosphate of zinc, to prevent the metal from passing between the joints and gripping and fracturing the porcelain tooth-blocks by the shrinkage in cooling. I also grind the free gum margin of the section-blocks beveling from the outer or lip toward the inner or alveolar edge, so as to preclude the metal from grasping the thin edge and fracturing the blocks by pulling toward the center of contraction, which will be the center of the dental arch.

Figures 6, 8:
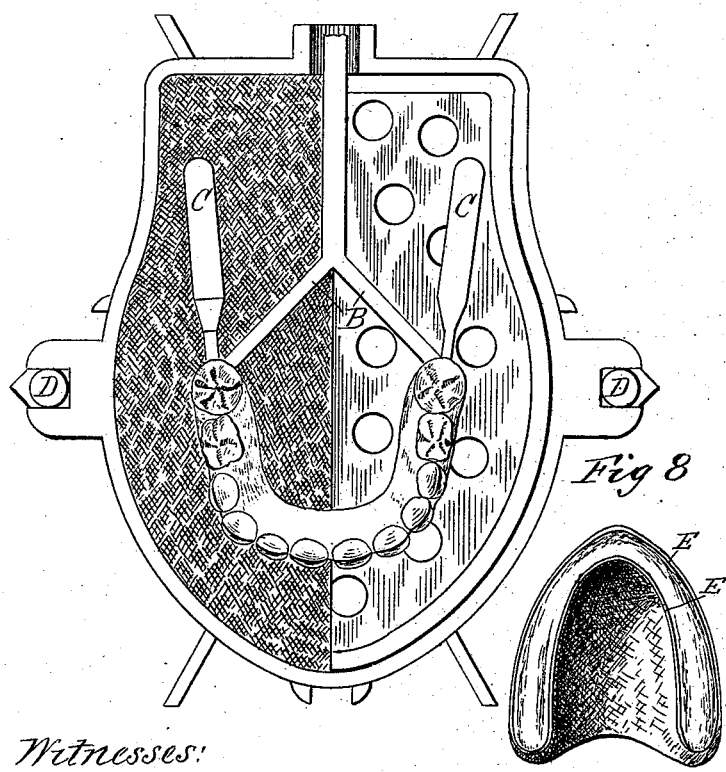
Figure 7:
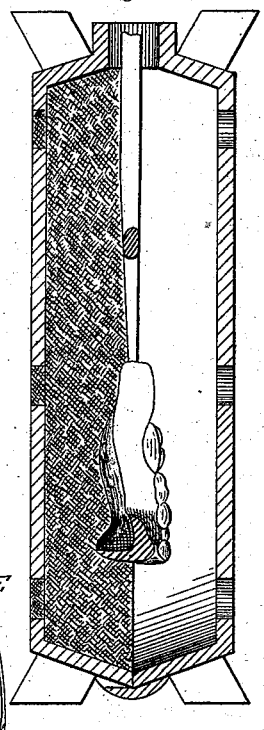

When I employ plain teeth in mounting a denture, I make under-cuts or flanges in the temporary wax base-plate around the palatine and alveolar borders surrounding the line where the teeth are to be mounted, which under-cuts or flanges will be reproduced in the aluminum cast denture, as shown in Fig. 8, letters E E. I then place wax along the alveolar border between the flanges and mount the teeth, properly articulated, trimming the wax neatly to the form desired. I then invest the teeth, mounted in wax on the metallic base-plate, in a two-part flask, and when the investing material is set I separate the flask and wash out the wax with hot water and pack the space occupied by the wax with celluloid or gum-colored rubber, and after properly heating the same close the flask and press the celluloid into proper form, or vulcanize the rubber, and then remove and polish or finish the denture, thereby attaching the teeth to the base-plate, and at the same time forming a gum-colored facing around the alveolar border of the denture instead of an unnatural metallic color, when exposed to view under the lip. I then mix my investing materials in about the proportions of three parts plaster-of-paris, one part sand or marble-dust, and one part pulverized steatite or soapstone, which sets readily, and makes a firm and secure matrix for the denture which I desire to cast. I then separate the flask and remove the temporary wax, crown, bridge, or base-plate, as the case may be, which I have invested for casting, washing out with boiling water all remaining wax or paraffine from the model and around the pins of the teeth where I desire the molten metal to flow in the act of casting. I then cut sprues (see B B B, Fig. 6) from the heel of my matrix to the pouring-point of the flask, so as to permit the free passage of the metal to all parts of the matrix, whether it be for a crown, bridge, or a dental plate. I also cut in the matrix channels or pockets C C, Fig. 6, from the heel near the pouring-point in a vertical direction, for the escape of gas or air, and at the same time to afford a place for a sustaining-column of molten metal, which will enable me to make a more perfect cast by forming a continuous mass of metal outside of and above my cast denture, which, being the highest and last portion of the mass of metal to cool, shall contain the markings or lines of shrinkage that would otherwise be left on and mar the surface of my denture. I now close the two-part flask and lock the same together tightly with the two bolts D D, as shown in the drawings, Fig. 6. I then lute the edge or seam of union of the two-part flask with plaster or other suitable material to prevent the escape of gas or metal through any cleavage that may occur in drying out my matrix.

Having now described my mode of mounting and investing for my cast dentures, I will now describe my mode of making the cast itself.

If I desire to make a crown, bridge, or dental plate for the upper arch or jaw, where lightness, stiffness, and strength are required, I employ pure aluminum, or, preferably, on account of the great tendency of said metal to contract in cooling, I use aluminum alloyed with silver and copper or other suitable metal having a tendency to expand in the arrangement of its molecules in the act of cooling, in such proportions as to almost entirely counteract the contracting tendency of the aluminum, and thus establish such an equilibrium of contraction and expansion as to insure a perfect cast in the matrix which I desire to fill, and also thereby avoid the fracture of any porcelain or artificial teeth that I may have mounted by the contraction of pure aluminum if used alone; and for this purpose I find, after many experiments, that a composition or alloy composed of aluminum ninety (90) to ninety-three (93) parts, silver, five (5) to nine (9) parts, and copper, one (1) part, answers this purpose admirably. I now melt this composition or alloy of aluminum in a compound pneumatic crucible, which forms the subject of another application for Letters Patent. I heat up my crucible and matrix in a double-chambered furnace particularly constructed for this purpose, and described in another application for Letters Patent, to near the temperature of the melting-point of my alloy, so as to avoid fracturing the artificial teeth in either the bridge or dental plate to be cast by a too sudden change of temperature when the molten metal is forced into the matrix by means of the pneumatic crucible above referred to, and to which, for a fuller understanding of the nature of casting, reference is made. As soon as the matrix is cooled, which I allow to take place slowly, I remove the cast denture and finish neatly, when it is ready for insertion after the usual manner for such appliances in the mouth of the wearer.

If the denture be intended for the lower arch, whether a crown, a bridge, or a dental plate, partial or complete, where accuracy of adaptation and weight are desired, I employ an alloy or composition of metal composed of silver three to fifteen parts, copper one part, aluminum five to nineteen parts, and tin eighty to eighty-five parts. This alloy is melted in a common open crucible and poured into the previously-prepared matrix for crown, bridge, or dental plate, as above described, which matrix does not require to be heated so highly as in the case where the former alloy is to be used, the degree of heat required being slightly below the melting-point of the alloy. I allow the matrix to cool slowly, when I remove the cast denture, finish and polish it neatly, and insert after the usual manner for such appliances, whether stationary and fixed or removable, at the will of the wearer.

Having described my process of making these cast dentures, I will now describe my method of mending the same in case of breakage, which is as follows:

If the denture to be mended be of aluminum or the alloy of aluminum first described, and a tooth or teeth are to be attached to take the place of those broken, (one or more,) I mount and wax neatly to the base-plate, as intended to be worn, a new tooth or teeth, as the case may require, in my two-part flask, as before described. After removing the wax form by hot water I cut a gate or sprue from the pocket made by the wax used in mounting to the pouring-point of the flask. I then lock my flask together, and after being thoroughly dried out I heat up this matrix with inclosed denture to a temperature just below the fusing-point of the base-plate. I then force into the matrix with my pneumatic crucible the higher alloy described of aluminum heated above the melting-point of the base-plate, so that when the melted alloy strikes the base-plate to be mended it will fuse the surface of the base-plate and produce a solid weld of the same to the base-plate, thus attaching the tooth or teeth firmly in the place desired to be mended. When cooled, the mended piece is finished as before described.

I do not claim as my invention either a crown, bridge, or dental plate; but,

Having fully described my invention, what I do claim, and desire to secure by Letters Patent, is—

1. The herein-described process of forming or mending dental crowns, bridges, and plates from aluminum or the alloys of aluminum by casting, which consists in taking an impression with suitable material of the space or cavity to be supplied, making a model thereof, molding on said model a form of the denture with the necessary number of teeth attached, investing the said model and denture in a flask, removing the wax from the model, closing the flask and submitting the same to heat until the denture and model are dried, conveying molten aluminum or the alloys thereof into the matrix, and cooling and finishing the denture, substantially as described.

2. The herein-described process of attaching to and gumming plain teeth on a dental plate, which consists in forming a groove or open space for the teeth on the outer side of the plate by forming flanges in the denture around the alveolar and palatine borders, filling said groove or space with wax, mounting the teeth properly articulated therein, investing the denture in a two-part flask, and when the investing material is set removing the wax and filling the space occupied thereby with celluloid or gum-colored rubber, and then molding or vulcanizing and finishing the same, substantially as described.

In testimony whereof I affix my signature in presence of two witnesses.

CRAFT C. CARROLL.

Witnesses:
L. SEWARD BACON,
M. A. BALLINGER.